United States Patent
Chen

Patent Number: 5,757,765
Date of Patent: May 26, 1998

[54] DISC PROTECTION STRUCTURE

[76] Inventor: Yao-Kuo Chen, No. 19, Lane 28, Yuhsi St., Yungho City, Taipei Hsien, Taiwan

[21] Appl. No.: 843,154

[22] Filed: Apr. 11, 1997

Related U.S. Application Data

[63] Continuation-in-part of Ser. No. 608,473, Feb. 28, 1996.

[51] Int. Cl.$^6$ .................... G11B 7/24; G11B 33/14
[52] U.S. Cl. ........................... 369/291; 369/283
[58] Field of Search ..................... 369/283, 284, 369/291, 292; 428/41.7, 42.1, 64.6, 65.5, 66.6, 908.8; 2306/307, 308.1, 313

[56] References Cited

U.S. PATENT DOCUMENTS

| | | | |
|---|---|---|---|
| 3,961,656 | 6/1976 | Aggarwal | 369/291 |
| 4,327,830 | 5/1982 | Patel et al. | 369/292 |
| 4,556,968 | 12/1985 | Pelkey et al. | 369/284 |
| 4,879,710 | 11/1989 | Iijima | 369/291 |
| 4,983,437 | 1/1991 | Merrick | 428/908.8 |
| 5,020,048 | 5/1991 | Arai et al. | 369/291 |
| 5,299,186 | 3/1994 | Tsurushima | 360/133 |

FOREIGN PATENT DOCUMENTS

| | | | |
|---|---|---|---|
| 599655 | 6/1994 | European Pat. Off. | |
| 3427381 | 1/1986 | Germany | 369/291 |
| 9414161 | 6/1994 | WIPO | 369/291 |

Primary Examiner—Stuart S. Levy
Assistant Examiner—David L. Ometz
Attorney, Agent, or Firm—A & J

[57] ABSTRACT

A protection structure adapted for protecting a disc includes a film mounted on an underside of the disc for covering a data reading region of the disc. The film includes an inner rim portion abutting on an inner annular portion of the disc, and an outer rim portion abutting on an outer annular portion of the disc. A plurality of ribs each a extend radially and inwardly from the inner rim portion of the film and each abut on the inner annular portion of the disc, and a plurality of recesses are each defined between adjacent two of the ribs. An annular adhesive sheet forms an adhesive surface which can be adhered on each of the ribs and can be adhered on the inner annular portion of the disc via each of the recesses, thereby securing each of the ribs on the inner annular portion of the disc.

2 Claims, 3 Drawing Sheets

DISC PROTECTION STRUCTURE

DISC PROTECTION STRUCTURE

The present invention refers to a Continuation-In-Part Application of the Applicant's U.S. Patent Application Ser. No. 08/608,473, filed on Feb. 28, 1996.

FIELD OF THE INVENTION

The present invention relates to a protection structure for protecting items such as compact discs and the like.

BACKGROUND OF THE INVENTION

The closest prior art of a disc protector was disclosed in Iijima's U.S. Pat. No. 4,879,710, filed on Apr. 20, 1988.

SUMMARY OF THE INVENTION

In accordance with one aspect of the present invention, there is provided a protection structure for protecting an item such as a disc and the like.

The disc includes an inner annular portion formed on a center thereof, an outer annular portion formed on an outer periphery thereof, and a data reading region mounted on an underside thereof and located between the inner and outer annular portions.

The protection structure comprises a film releasably mounted on the underside of the disc for covering and shielding the data reading region.

The film includes an inner rim portion abutting on the inner annular portion of the disc and defining a hole therein, and includes an outer rim portion abutting on the outer annular portion of the disc.

A plurality of ribs each extend radially and inwardly from the inner rim portion of the film and each abut on the inner annular portion of the disc, and a plurality of recesses are each defined between adjacent two of the plurality of ribs and each communicate with the hole.

An annular adhesive sheet has an adhesive surface formed thereon. A semi-annular first releasing sheet is releasably attached on the adhesive surface of the adhesive sheet. A semi-annular second releasing sheet is releasably attached on the adhesive surface of the adhesive sheet and is juxtaposed to the first releasing sheet, thereby entirely enclosing the adhesive surface.

By such an arrangement, the adhesive surface of the adhesive sheet can be adhered on each of the ribs and can be adhered on the inner annular portion of the disc via each of the recesses when the first and second releasing sheets are detached from the adhesive surface, thereby securing each of the ribs on the inner annular portion of the disc.

Further features of the present invention will become apparent from a careful reading of the detailed description with appropriate reference to the accompanying drawings.

DETAILED DESCRIPTION OF THE PREFERRED EMBODIMENTS

Figure 1:
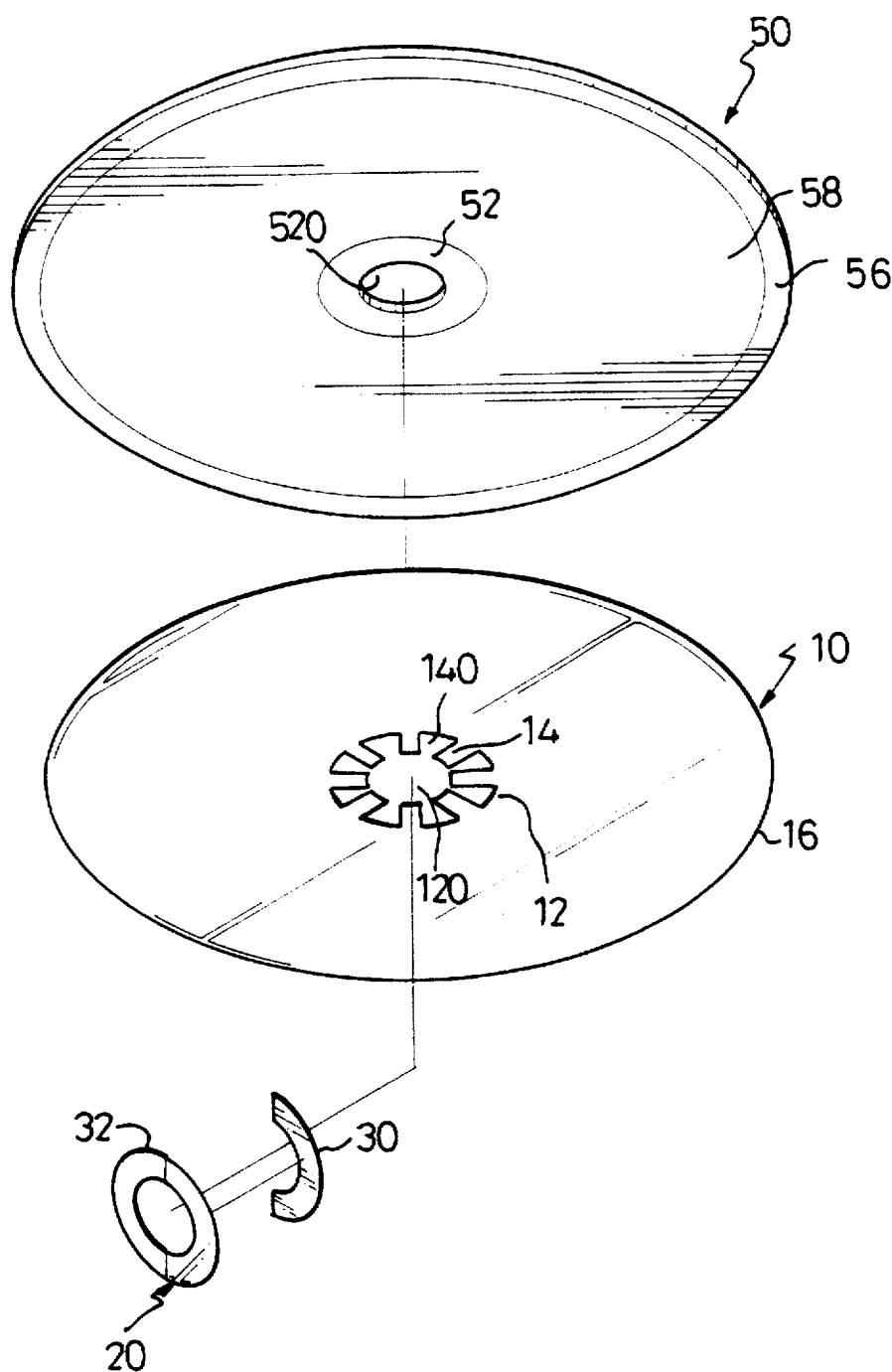
FIG. 1 is an exploded view of a protection structure for a disc in accordance with the present invention.
Figure 2:
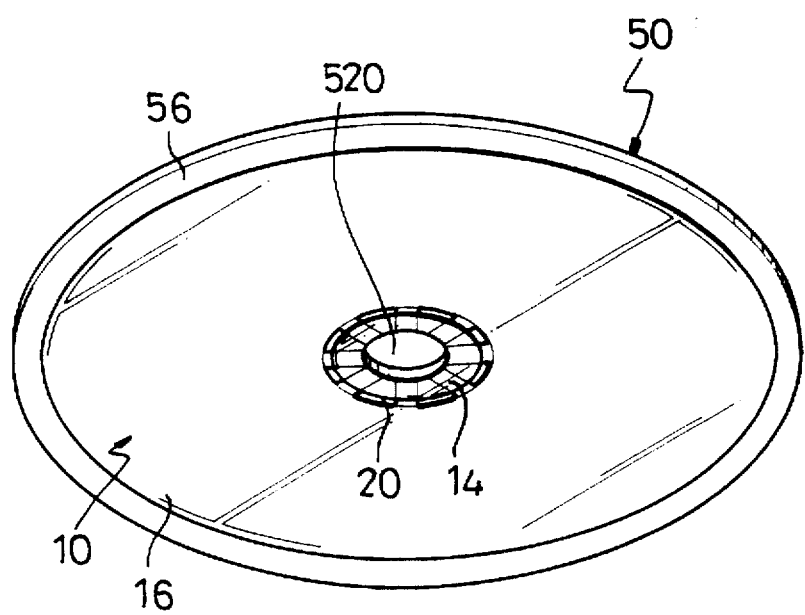
FIG. 2 is an assembly view of FIG. 1.

Referring to the drawings, a protection structure in accordance with the present invention can be provided for protecting a disc 50 such as a compact disc (C.D.), a laser disc (L.D.) and the like.

The disc 50 includes an inner annular portion 52 formed on a center thereof, an outer annular portion 56 formed on an outer periphery thereof, and a data reading region 58 mounted on an underside thereof and located between the inner and outer annular portions. Preferably, a center hole 520 is defined in the inner annular portion 52. In addition, the data reading region 58 is formed by a plurality of concentric grooves serially and closely arranged with each other for storing digital data therein.

The protection structure comprises a protective film 10 releasably mounted on the underside of the disc 50 for closely covering and entirely shielding the data reading region 58 of the disc 50. The protective film 10 is preferably a transparent film with a thickness smaller than sixty micrometers (µm).

The protective film 10 includes an inner rim portion 12 abutting on the inner annular portion 52 of the disc 50 and defining a hole 120 therein which aligns with the center hole 520, and includes an outer rim portion 16 abutting on the outer annular portion 56 of the disc 50.

A plurality of ribs 14 each extend radially and inwardly from the inner rim portion 12 of the film 10 and each abut on the inner annular portion 52 of the disc 50. A plurality of recesses 140 are each defined between adjacent two of the plurality of ribs 14 and each communicate with the hole 120.

An annular adhesive sheet 20 has an adhesive surface 22 formed thereon which is coated with a binding agent or an adhesive. Preferably, the adhesive sheet 20 is transparent.

A semi-annular first releasing sheet 30 is releasably attached on the adhesive surface 22 of the adhesive sheet 20. A semi-annular second releasing sheet 32 is releasably attached on the adhesive surface 22 of the adhesive sheet 20 and is juxtaposed to the first releasing sheet 30, thereby enclosing the adhesive surface 22.

Preferably, each of the first and second releasing sheets 30 and 32 is coated with a releasing agent such that each of the first and second releasing sheets 30 and 32 can be releasably attached on the adhesive surface 22 of the adhesive sheet 20.

By such an arrangement, the adhesive surface 22 of the adhesive sheet 20 can be adhered on each of the ribs 14 and can be adhered on the inner annular portion 52 of the disc 50 via each of the recesses 140 when the first and second releasing sheets 30 and 32 are detached from the adhesive surface 22, thereby securing each of the ribs 14 on the inner annular portion 52 of the disc 50.

Figure 3:
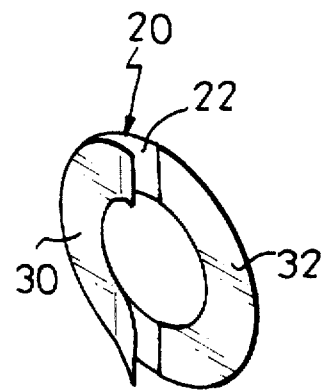
FIG. 3 is an operational view showing a releasing sheet being detached from an adhesive sheet.
Figure 4:
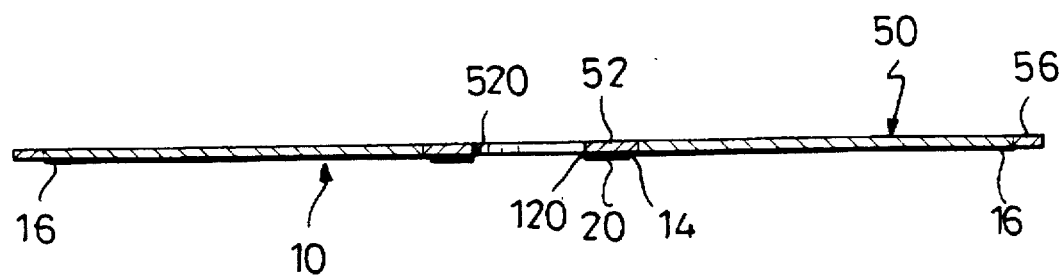
FIG. 4 is a front plan cross-sectional view of FIG. 2.

In operation, especially referring to FIGS. 1 and 3, the protective film 10 is initially mounted on the underside of the disc 10 with each of the ribs 14 of the inner rim portion 12 abutting on the inner annular portion 52 and with the outer rim portion 16 abutting on the outer annular portion 56.

The first releasing sheet 30 can firstly be detached from the adhesive surface 22 of the adhesive sheet 20 by means of exerting a bending moment on the first releasing sheet 30 such that a first half of the adhesive surface 22 is exposed and can be attached on a first half of the plurality of ribs 14 and can be adhered on a first half of the inner annular portion 52 of the disc 50 via the recesses 140.

The second releasing sheet 32 can then be detached from the adhesive surface 22 of the adhesive sheet 20 by means of exerting a bending moment on the second releasing sheet 32 such that a second half of the adhesive surface 22 is exposed and can be attached on a second half of the plurality of ribs 14 and can be adhered on a second half of the inner annular portion 52 of the disc 50 via the recesses 140.

By such an arrangement, the inner rim portion 12 of the protective film 10 can be securely attached on the inner annular portion 52 of the disc 50 by means of the adhesive sheet 20.

The outer rim portion 16 of the protective film 10 can then be attached on the outer annular portion 56 of the disc 50 by means of an attractive interaction of the static electricity such that the protective film 10 can be closely mounted on the underside of the disc 50, thereby preventing the disc 50 from being scratched or dirtied, and thereby insuring the safety and precision of the data reading region 58.

The protective film 10 can easily be removed from the underside of the disc 50, thereby being exchanged by a new protective film during long-term utilization or after being scratched or dirtied.

It should be clear to those skilled in the art that further embodiments of the present invention may be made without departing from disclosures of the present invention.

What is claimed is:

1. A protection structure for protecting a disc (50) which includes an inner annular portion (52) formed on a center thereof, an outer annular portion (56) formed on an outer periphery thereof, and a data reading region (58) mounted on an underside thereof and located between said inner annular portion (52) and said outer annular portion (56), said protection structure comprising:

a film (10) releasably mounted on the underside of said disc (50) for covering said data reading region (58), said film (10) including an inner rim portion (12) abutting on said inner annular portion (52) of said disc (50) and defining a hole (120) therein, and including an outer rim portion (16) abutting on said outer annular portion (56) of said disc (50), a plurality of ribs (14) each extending radially and inwardly from said inner rim portion (12) of said film (10) and each abutting on said inner annular portion (52) of said disc (50), and a plurality of recesses (140) each defined between adjacent two of said plurality of ribs (14) and each communicating with said hole (120);

an annular adhesive sheet (20) having an adhesive surface (22) formed thereon;

a semi-annular first releasing sheet (30) releasably attached on said adhesive surface (22) of said adhesive sheet (20); and a semi-annular second releasing sheet (32) releasably attached on said adhesive surface (22) of said adhesive sheet (20) and juxtaposed to said first releasing sheet (30), thereby enclosing said adhesive surface (22);

whereby, said adhesive surface (22) of said adhesive sheet (20) is adhered on each of said ribs (14) and is adhered on said inner annular portion (52) of said disc (50) via each of said recesses (140) when said first and second releasing sheets are detached from said adhesive surface (22), thereby securing each of said ribs (14) on said inner annular portion (52) of said disc (50).

2. The protection structure in accordance with claim 1, wherein said first releasing sheet (30) is firstly detached from said adhesive surface (22) of said adhesive sheet (20) such that a first half of said adhesive surface (22) is attached on a first half of said plurality of ribs (14) and is adhered on a first half of said inner annular portion (52) of said disc (50) via said recesses (140), and said second releasing sheet (32) is then detached from said adhesive surface (22) of said adhesive sheet (20) such that a second half of said adhesive surface (22) is attached on a second half of said plurality of ribs (14) and is adhered on a second half of said inner annular portion (52) of said disc (50) via said recesses (140).

* * * * *